United States Patent
Lin et al.

(10) Patent No.: US 6,975,690 B1
(45) Date of Patent: Dec. 13, 2005

(54) SIGNAL FOLDING COHERENT ACQUISITION FOR WEAK GLOBAL POSITIONING SYSTEM (GPS) C/A CODED SIGNAL

(75) Inventors: David M. Lin, Beavercreek, OH (US); James B. Y. Tsui, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 824 days.

(21) Appl. No.: 09/929,720

(22) Filed: Aug. 15, 2001

(51) Int. Cl.[7] .............................................. H04I 27/14
(52) U.S. Cl. ...................... 375/326; 375/147; 375/130; 370/335; 370/252
(58) Field of Search .............................. 375/326, 147, 375/130; 701/213; 370/335, 252

(56) References Cited

U.S. PATENT DOCUMENTS

| | | | |
|---|---|---|---|
| 5,799,010 A | 8/1998 | Lomp et al. ................ 370/335 |
| 6,049,535 A | 4/2000 | Ozukturk et al. ........... 370/335 |
| 6,157,619 A | 12/2000 | Ozluturk et al. ............. 370/252 |
| 6,195,328 B1 | 2/2001 | Tsui et al. .................... 370/210 |
| 6,212,174 B1 | 4/2001 | Lomp et al. ........... 318/568.11 |
| 6,215,778 B1 | 4/2001 | Lomp et al. ................. 370/335 |
| 6,256,559 B1 | 7/2001 | Tsui et al. ....................... 701/4 |
| 6,725,157 B1 * | 4/2004 | Yu .............................. 701/213 |
| 2003/0139879 A1 * | 7/2003 | Krasner ....................... 701/213 |
| 2003/0161543 A1 * | 8/2003 | Tanaka ........................ 382/250 |
| 2003/0223477 A1 * | 12/2003 | Loomis et al. .............. 375/147 |

\* cited by examiner

Primary Examiner—Shuwang Liu
Assistant Examiner—Eva Zheng
(74) Attorney, Agent, or Firm—AFMCLO/JAZ; Gina S. Tollefson; Gerald B. Hollins

(57) ABSTRACT

A simplified, weak GPS C/A code coherent acquisition method. When performing GPS signal acquisition, the strength of a signal received at a GPS receiver having an outside antenna is generally sufficiently strong such that only 1 ms of data needs to be used in acquisition to find the signal. However, for weak signals received at a GPS receiver, when the antenna is inside a building or vehicle, for example, a long record of data is needed for acquisition. The present invention reduces the calculation burden for GPS signal acquisition for a weak signal.

7 Claims, 10 Drawing Sheets

Fig. 5 input signal and 10 cycles of C/A code

SIGNAL FOLDING COHERENT ACQUISITION FOR WEAK GLOBAL POSITIONING SYSTEM (GPS) C/A CODED SIGNAL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to global positioning system (GPS) satellite signal acquisition and more specifically to a faster computation algorithm for GPS P(Y) code and multiple blocks C/A code satellite signal acquisition.

The nominal GPS operational constellation consists of 24 satellites that orbit the earth in 12 hours. The control segment consists of tracking stations located around the world. The GPS user segment consists of the GPS receivers and the user community. GPS satellite transmits specially coded satellite signals that can be processed by GPS receivers and provide the information to compute a user's velocity, time and position.

The GPS satellites transmit two microwave carrier signals. FIG. 1 is a prior art drawing of GPS signals. The L1 frequency (1575.42 MHz) shown at 100 carries the navigation message. The L2 frequency represented at 105 (1227.60 MHz) is used to measure the ionospheric delay by precise positioning service equipped receivers. Three binary codes shift the L1 and/or L2 carrier phase.

The Coarse Acquisition Code (C/A) shown at 102 modulates the L1 carrier phase. The C/A code is a repeating 1 MHz Pseudo Random Noise (PRN) Code. This noise-like code modulates the L1 carrier signal, "spreading" the spectrum over a 2 MHz bandwidth. The C/A code repeats every 1023 bits (one millisecond). There is a different C/A code PRN for each GPS satellite. GPS satellites are often identified by their PRN number, the unique identifier for each pseudo-random-noise code. The C/A code that modulates the L1 carrier is the basis for the civil standard positioning service (SPS).

The P-Code (Precise) shown at 104 modulates both the L1 and L2 carrier phases. The P-Code is a very long (seven days) 20 MHz PRN code. In the Anti-Spoofing (AS) mode of operation, the P-Code is encrypted into the Y-Code. The encrypted Y-Code requires a classified AS Module for each receiver. Therefore, only authorized users with cryptographic keys can use it. The P (Y)-Code is the basis for the precise positioning service (PPS).

The navigation message shown at 103 also modulates the L1-C/A code signal. The Navigation Message is a 50 Hz signal consisting of data bits that describe the GPS satellite orbits, clock corrections, and other system parameters.

The C/A code and P(Y) code are code division multiple access (CDMA) systems where a pair of unique signals are assigned to each satellite in the GPS phase of the C/A code or the P(Y) code. The GPS receiver applies correlation to measure timing. The received signal is correlated with the locally generated replicas of the selected satellite's signal. This process is called acquisition. The traditional GPS receiver acquires this phase by continuous sliding, multiplication, and addition. This process is time consuming and is not conducive to miniaturized receivers. The C/A code is used in civilian GPS receivers and the military GPS receivers use both C/A code and P(Y) code. In general, the military receiver acquires the C/A code and transfers this timing to P(Y) code for tracking. However, if the military GPS receiver is under hostile environment and exposed to a strong jamming threat, the less vulnerable direct P(Y) acquisition becomes necessary. The present invention applies to both the C/A code and the P(Y) code to reduce the calculations required to find a weak GPS signal through coherent acquisition.

The conventional P(Y) code acquisition uses a time domain correlation approach as shown in FIG. 2. For each satellite, this approach correlates 10 ms of received sampled data (500,000 data points if sampled at 50 MHz), represented at 200 with 200 locally generated replica, represented at 201. These replica are represented by $$r(m)=P_j(m\Delta f)\exp(j2\pi t_k m\Delta t) \qquad (1)$$

where $\Delta t$ is sampling interval, $P_j(m\Delta t)$ is the sampled P(Y) code of satellite j, m=0, 1, 2, ..., 499,999 is a time index, and, $f_k$ is the center frequency of the locally generated replica. To acquire the P(Y) code of the received signal from a targeted satellite, 200 locally generated replica are correlated with 500,000 sampled points of the received signal. If any of these 200 correlation result is above the threshold which is pre-determined by the correlation noise floor statistics, the code and the carrier frequency acquisition is completed, as is represented at 202. If none of the results is above the threshold, another 500,000 sampled data will be processed in the same manner, as represented at 203. This new 500,000 data set, represented at 204, only shifts one data point from the previous one. This process continues until either a signal is found or 2 ms of search range is exhausted. For ±1 ms of search range, the average amount of mathematical operations is 200×100,000 500000-point correlation, making the known approach a time consuming and energy consuming operation.

To find a GPS C/A code signal, one need to find its carrier frequency and the beginning of the code. The C/A code is repetitive every millisecond, thus it is adequate to search for 1 ms of data if the signal is reasonably strong. An acquisition method is required to search in both the time and frequency domains. For a high speed aircraft, the expected Doppler frequency range can be +/−10 KHz. Therefore, the acquisition will search 20 KHz for the frequency. Let us assume that the input signal is digitized at 5 MHz. One millisecond of data contains of 5,000 data points.

One way to perform acquisition is through circular correlation in frequency domain. In this approach the following steps are performed.

(a) Generate a group of complex radio frequency (RF) signals according to the length of the data to be processed. This data length should be a multiple number of 1 ms. The frequency of this signal must be +/−10 KHz around the carrier frequency with the frequency resolution equal to 1 over the data length. Perform steps (b) through (g) for each complex radio frequency signal generated in step (a).

(b) Multiply the input signal by one of the complex RF signals. The resultant signal is very close to base band (or zero frequency). The operation can be expressed mathematically as $$s_1(n)=s(n)\cdot rf(n) \qquad (Eq. 1)$$

where s(n) is the digitized input signal and rf(n) is the digitized complex radio frequency (RF) signal in time domain, which can be expressed as $$rf(n)=e^{j2ft}(n) \qquad (Eq. 2)$$

(c) Transfer $s_1$ from time domain to frequency domain through the fast Fourier transform (FFT) to frequency domain as $$S_1(k)=FFT[s_1(n)] \quad \text{(Eq. 3)}$$

(d) Take the digitized C/A code of a certain satellite and make them to match the input data length, which is a multiple of ms. Call this signal c(n).

(e) Take the FFT of c(n) and then take the complex conjugate as $$C(k)=\{FFT[c(n)]\}^* \quad \text{(Eq. 4)}$$

Where * represents taking complex conjugate.

(f) Multiply C(k) and $S_1(k)$ and take inverse FFT. The result is $$r(n)=IFFT[S_1(k)C(k)] \quad \text{(Eq. 5)}$$

where r(n) is the circular correlation result of $s_1(n)$ and c(n).

(g) Take the absolute value of r(n) and find the maximum. If the maximum is greater than the precalculated threshold, the value n of the maximum is the beginning of the C/A code and the RF frequency is the frequency of the carrier.

Consider the description of circular correlation with 1 ms of data. One millisecond of data in time domain can generate 1 KHz resolution in the frequency domain. Therefore, the acquisition program will search the 20 KHz frequency range in 1 KHz steps. There are 21 frequency bins to be searched from −10 KHz to +10 KHz. This approach performs 5,000 point FFT and inverse FFT at each frequency.

Consider the description of circular correlation with 10 ms of data. Ten milliseconds of data digitized at 5 MHz generates 50,000 points. Also, ten milliseconds of data in time domain can generate 100 Hz resolution in the frequency domain. Therefore, the acquisition program will search the 20 KHz frequency range in 100 Hz steps. There are 201 frequency bins to be searched from −10 KHz to +10 KHz. Following the discussion in the previous section, this approach performs 50,000 point FFT and inverse FFT at each frequency. This approach can find weaker GPS signals. One can see that this approach increases the complication of calculation tremendously.

For a GPS receiver with an outside antenna, the signal strength is sufficiently strong such that 1 ms of data can be used for acquisition to find the signal. However, for weak signals, such as placing an antenna indoors, a long record of data is needed for acquisition. The present invention can reduce calculations for acquiring GPS signals using a coherent acquisition method.

SUMMARY OF THE INVENTION

When performing GPS signal acquisition, the strength of a signal received at a GPS receiver having an outside antenna is generally sufficiently strong such that only 1 ms of data needs to be used in acquisition to find the signal. However, for weak signals received at a GPS receiver, when the antenna is inside a building or vehicle, for example, a long record of data is needed for acquisition. The present invention reduces the calculation burden for GPS signal acquisition for a weak signal.

It is therefore an object of the invention to provide a simplified coherent acquisition method for weak GPS C/A code.

These and other objects of the invention are described in the description, claims and accompanying drawings and are achieved by a simplified, weak GPS C/A code coherent acquisition method comprising the steps of:

Receiving a weak global positioning system C/A code digitized data signal of a length of N ms;
generating a complex radio frequency digitized signal with a length of N ms as a local reference signal;
first multiplying said digitized data signal from said receiving step with said digitized complex radio frequency signal;
dividing a product from said multiplying of digitized data signal with digitized complex radio frequency signal into N equal sections;
adding data signals in N equal sections together from said dividing step;
first applying a fast Fourier transform to a sum of data signals from
acquiring 1 ms of digitized C/A code of a preselected GPS satellite;
second applying a fast Fourier transform to said 1 ms of digitized C/A code of a preselected GPS satellite from said acquiring step;
taking a complex conjugate of said fast Fourier transformation from said second applying step;
second multiplying said complex conjugate from said taking step with said fast Fourier transformation from said first applying step; and
taking an inverse fast Fourier transform of a product from said second multiplying step, an index of the maximum of said inverse fast Fourier transform being an initial phase of the C/A code.

DETAILED DESCRIPTION

The present invention simplifies the calculation of a coherent acquisition method for weak coarse/acquisition (C/A) code. The present invention may be described as a signal folding acquisition method because several 1 ms of data are folded and added. For purposes of simplicity, and in order to be comparably descriptive with conventional methods previously described, the signal folding acquisition method will be illustrated using 10 ms of data, however the present invention is operable with a wide range of N values, signal record lengths.

Figure 1:
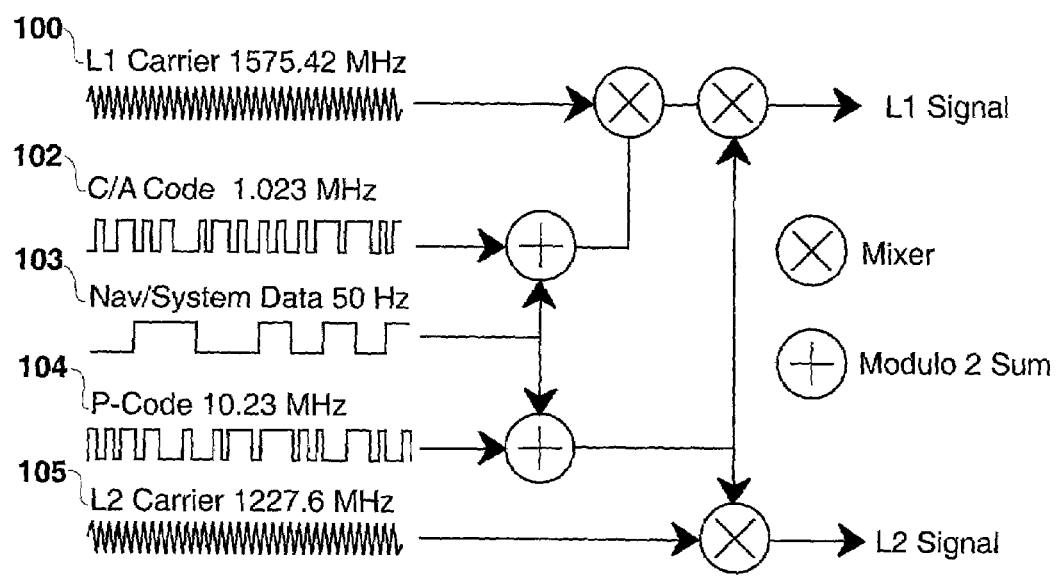
FIG. 1 is a prior art description of GPS satellite signals.
Figure 2:
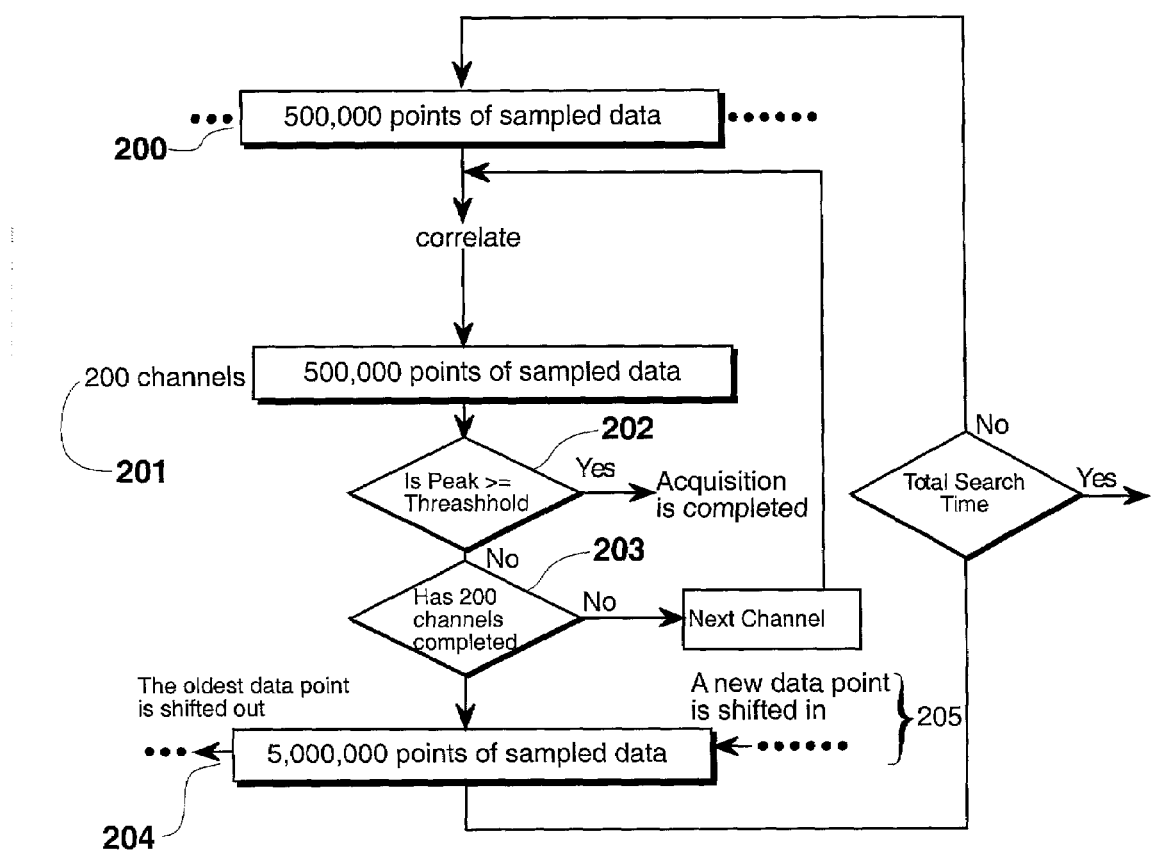
FIG. 2 shows a prior art conventional time domain approach for a GPS receiver.
Figure 3:
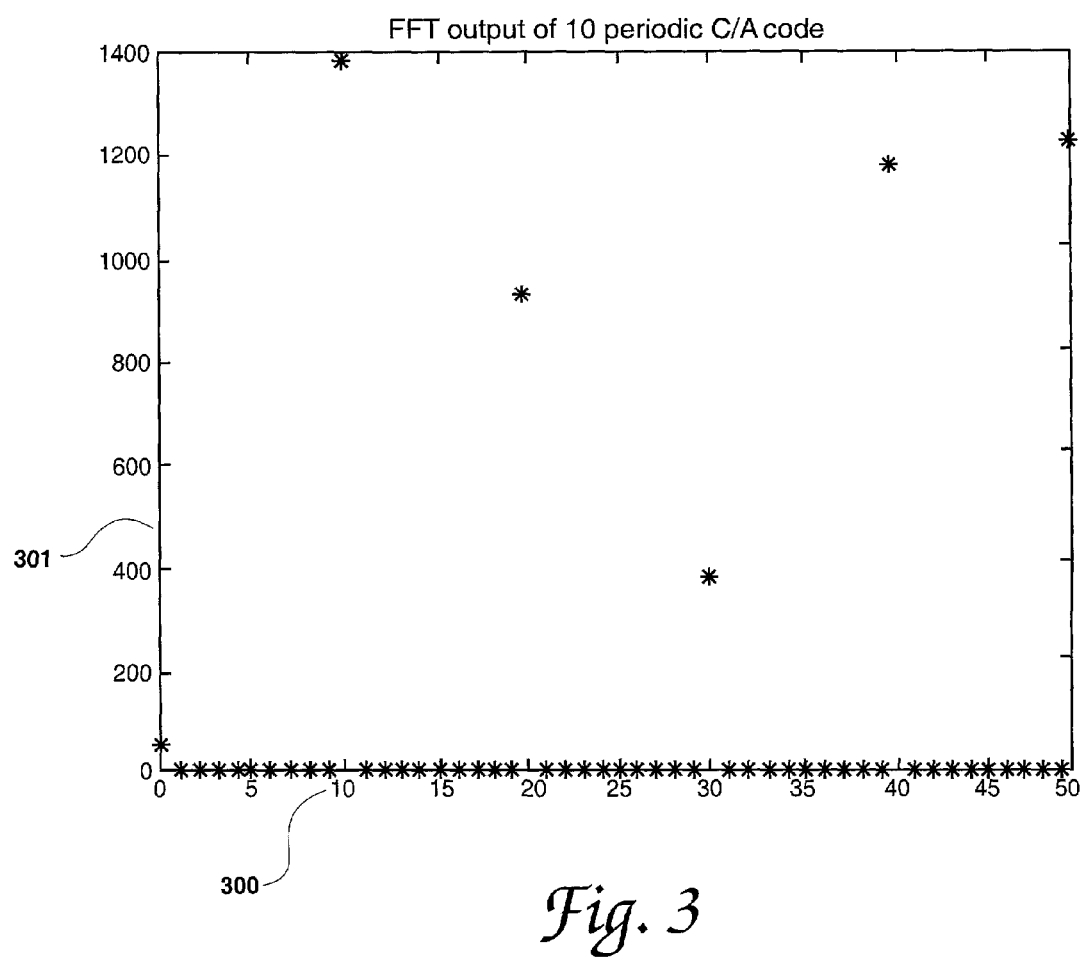
FIG. 3 shows a frequency domain output of a fast Fourier transform of 10 periodic C/A code.

Using a ten millisecond record of data, the code function c(n) in Eq. 4 repeats itself 10 times. Recall, c(n) is the digitized C/A code of a certain satellite signal. The frequency domain result C(k) generated through the FFT of such a periodic function, c(n), is shown in FIG. 3. In FIG. 3, the x-axis at 301 represents frequency bins and the y-axis at 300 represents power density. In FIG. 3, the output should be 50,000 points but only 51 points (from 0 to 50) are shown. Only 51 points are shown because the C/A code repeats itself each 1 ms and the total data length is 10 ms.

Figure 4:
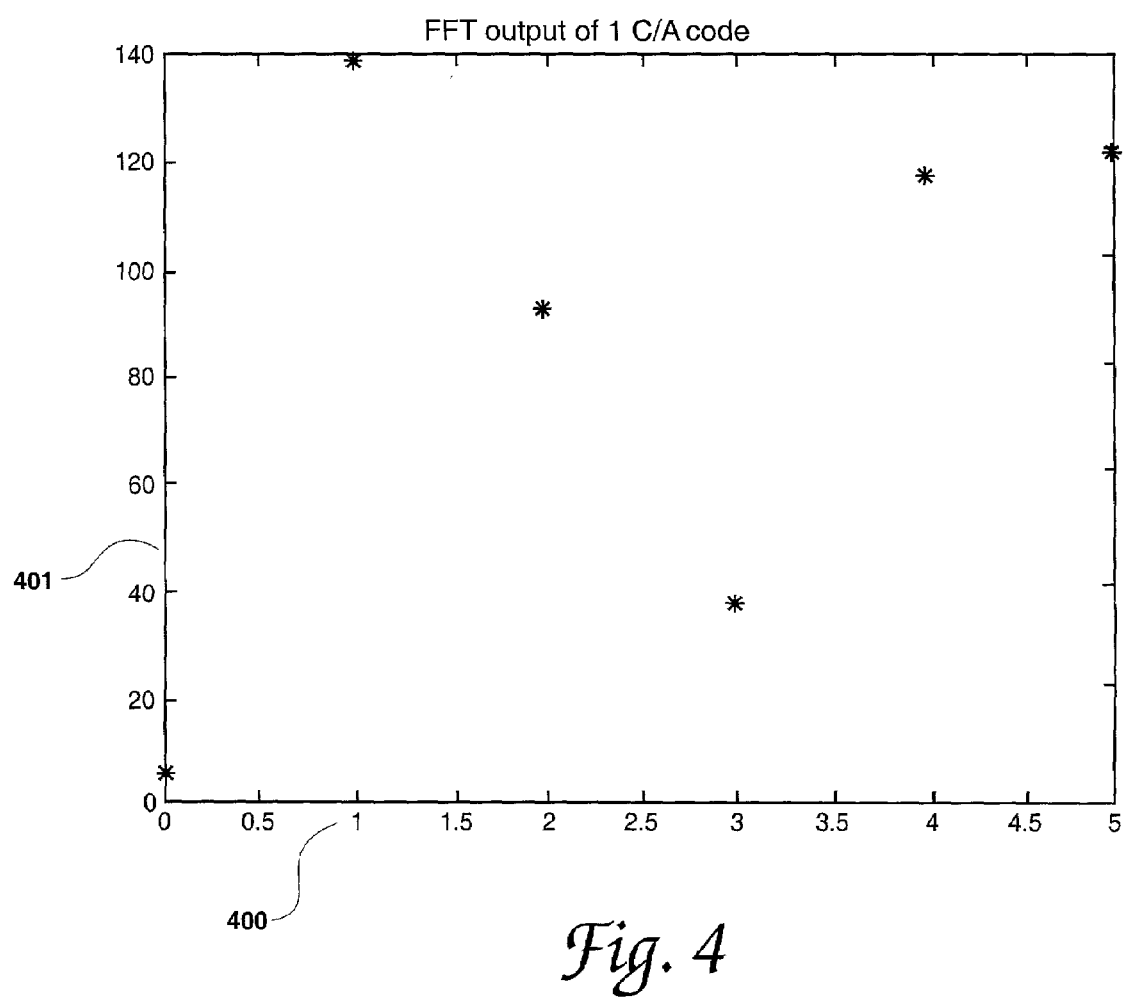
FIG. 4 shows a frequency domain output of a fast Fourier transform of 1 C/A code.

FIG. 4 illustrates signal acquisition employing the present invention using a 1 ms record length of C/A code and the C(k) values are obtained from a 5,000 c(n) through FFT. In FIG. 4 the x-axis represents frequency bin, the y-axis represents power density and the symbol "*" represents the power density of the fast Fourier transform of the C/A code. In FIG. 4 six points indicated by * are shown. Comparing FIGS. 3 and 4, one can see that the partial result of the 50,000 point C(k), illustrated in FIG. 3, can be obtained from a 5,000 point C(k), illustrated in FIG. 4. In other words, properly padding the 5,000 point C(k) with zeros produces the same result as the 50,000 point C(k).

Figure 9:
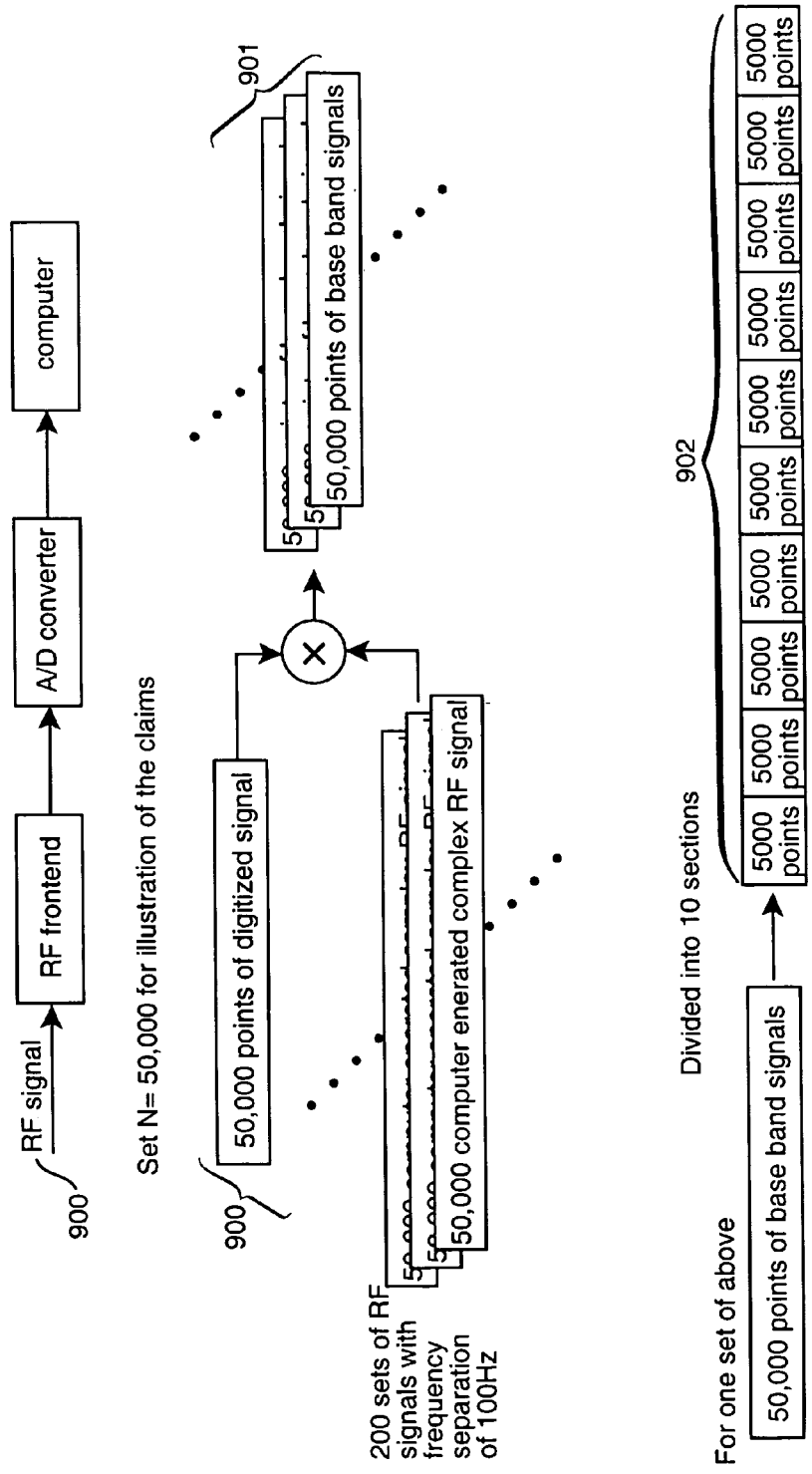
Figure 10:
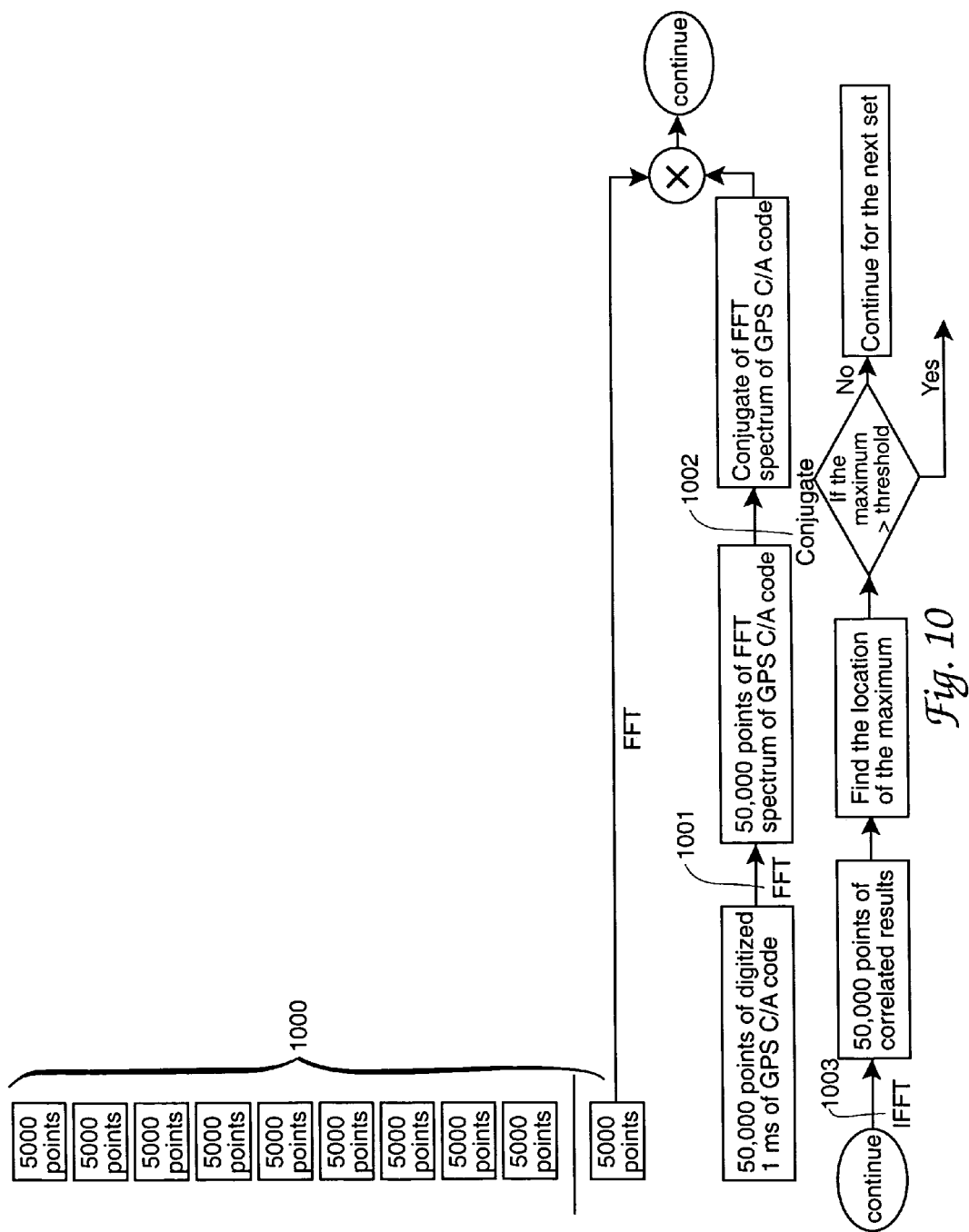

Since most of the values in the 50,000 point C(k) are zeros, the corresponding terms in $S_1(k)C(k)$ are also zero. The acquisition method can be simplified as follows and is illustrated in FIGS. 9 and 10 of the drawings:

(a) Generate a complex RF signal of 10 ms long, illustrated at 900 in FIG. 9, as shown in Eq. 2 with a frequency resolution of 100 Hz. To cover 20 KHz frequency range, 201 frequency bins are required.

(b) Multiply a GPS antenna received input signal, illustrated at 901 in FIG. 9, by the complex RF signal from (a) and the result is $$s_1(n) = s(n) \cdot rf(n) \qquad \text{(Eq. 6)}$$

where s(n) has 50,000 points.

(c) Divide $s_1$ into 10 equal sections and each has 5,000 points, illustrated at 902 in FIG. 9. Add all the ten sections together, illustrated at 1000 in FIG. 10, and the result is $s_2(n)$, which has 5,000 points. Take the FFT of $s_2(n)$, illustrated at 1001 in FIG. 10, the result is $$S_2(k) = FFT[s_2(n)] \qquad \text{(Eq. 7)}$$

(d) Take the C/A code of a certain satellite of 1 ms long and call this signal $c_1(n)$.

(e) Take the FFT of $c_1(n)$ and then take the complex conjugate, illustrated at 1002 in FIG. 10, as $C_1(k)$ and then multiply with $S_2(k)$ and take the inverse FFT, illustrated at 1003. The result is $$r_1(n) = IFFT[S_2(k)C_1(k)] \qquad \text{(Eq. 8)}$$

where $r_1(n)$ is the circular correlation result of $s_2(n)$ and $c_1(n)$. In this approach, the frequency search range is still 201 bins. However, in each frequency bin the FFT and inverse FFT only perform 5,000 points, minimizing the calculation burden required in conventional approaches.

Figure 5:
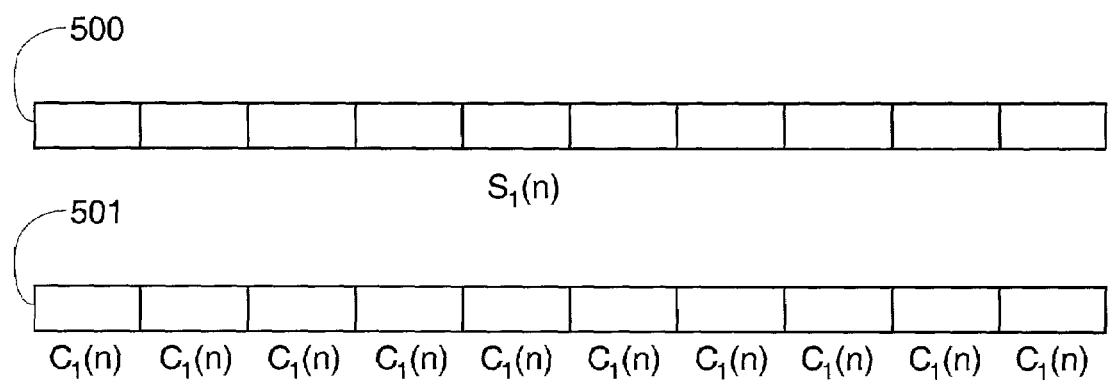
FIG. 5 shows a block diagram representation of an input signal and 10 cycles of C/A code.

The signal folding acquisition of the present invention may also be illustrated in the time domain. FIG. 5 shows 50,000 point input signal $s_1(n)$, represented at 500, and 50,000 points (or 10 cycles) of C/A code in the time domain, represented at 501. Each section of the input signal $s_1(n)$ is correlated with the same C/A code. Therefore, mathematically, one can add all the 10 sections of the signal and correlate it with one cycle of C/A code. It should be noted that the input signal must be shifted to base band through the multiplication of rf(n).

Figure 6:
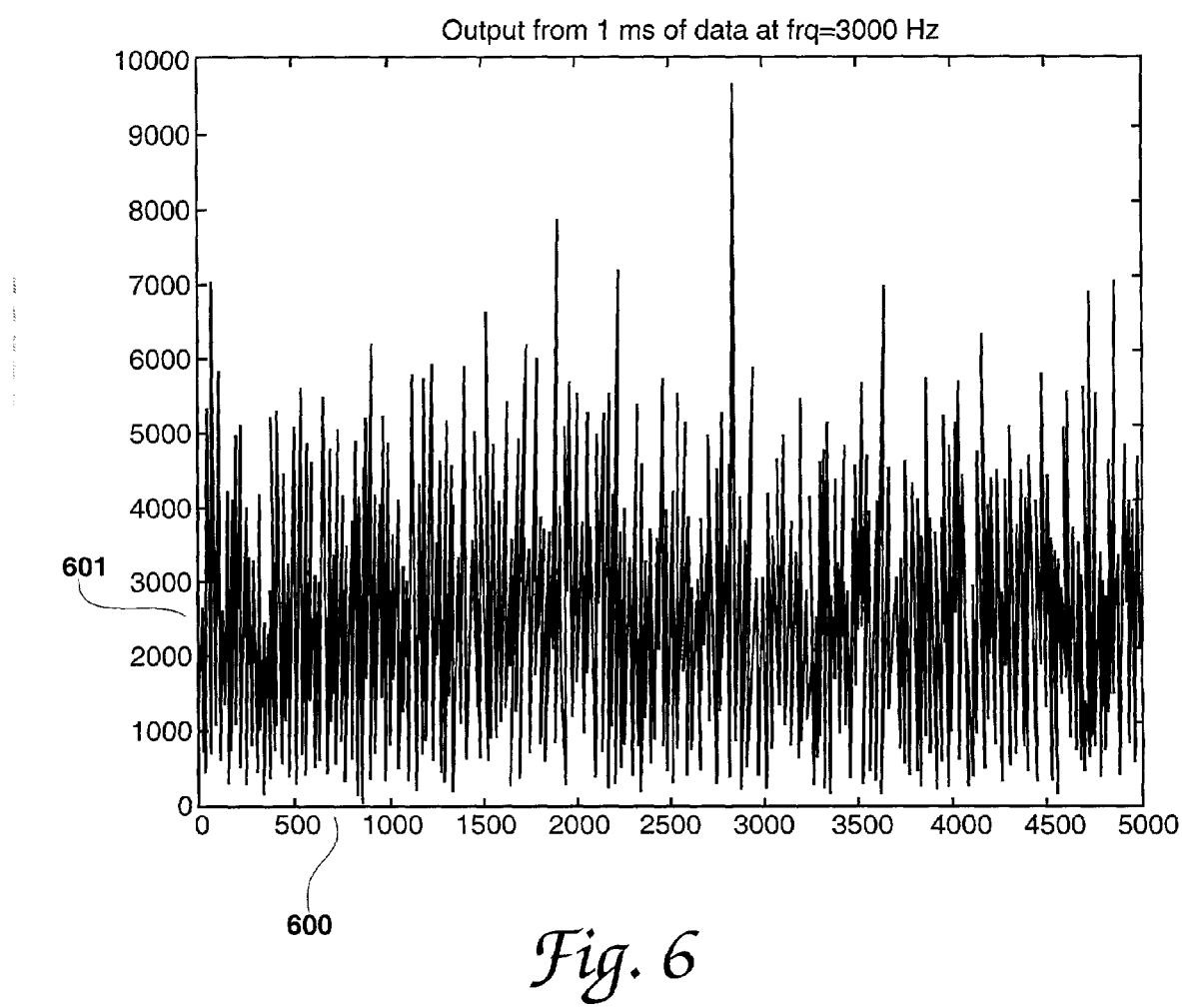
FIG. 6 shows a frequency domain graph of an output from 1 ms of data at 3000 Hz.
Figure 7:
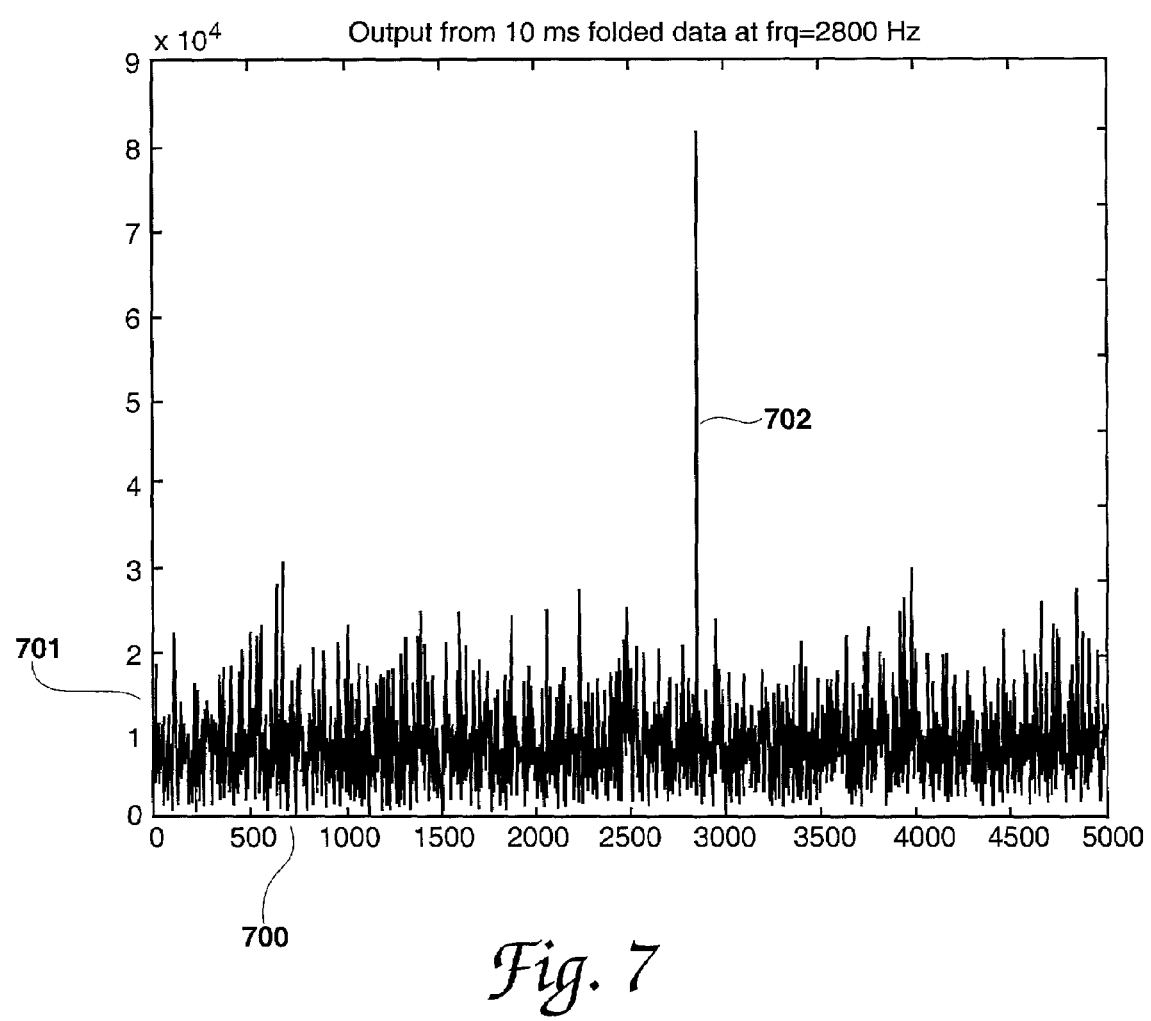
FIG. 7 shows a frequency domain graph of output form 10 ms folded data at 2800 Hz.
Figure 8:
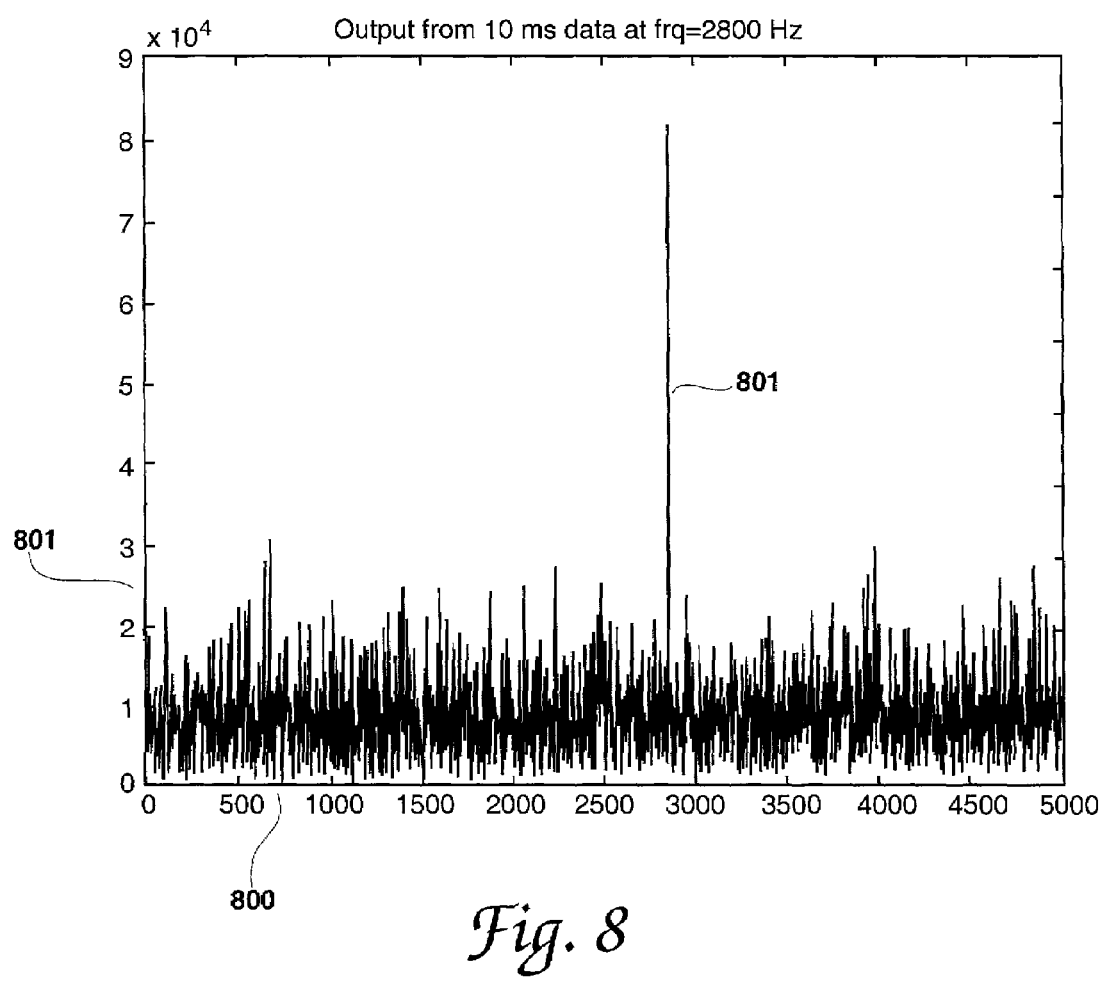
FIG. 8 shows a frequency domain graph of output form 10 ms data at 2800 Hz.

FIGS. 6, 7 and 8 illustrate the improved signal acquisition of the present invention in the frequency domain using varying records of data at varying frequencies. FIG. 6 shows the result of using 1 ms of data. In FIG. 6, the x-axis at 601 represents time index and the y-axis at 600 represents power density. The frequency is at −3000 Hz because the frequency step is 1 KHz. The signal is not clearly recognizable.

FIG. 7 shows the result of using 10 ms of data. Similarly, in FIG. 7, the x-axis at 700 represents time index and the y-axis at 701 represents power density. In FIG. 7, the result is the first 5000 points obtained through 50,000 point FFT and inverse FFT. The frequency step is 100 Hz, the carrier frequency is at −2800 Hz. The signal at 702 is clearly shown.

Finally, FIG. 8 shows the output using the signal folding acquisition method of the present invention. In FIG. 8 the x-axis at 801 represents time and the y-axis at 800 represents power density. In FIG. 8, the result is obtained from 5,000 point FFT and it is almost identical to the result shown in FIG. 7. FIG. 8 illustrates that the folding method of the present invention requires less calculating but provides the same result as the conventional acquisition method for acquiring GPS C/A signals longer than 1 ms.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. A simplified, weak GPS C/A code coherent acquisition method comprising the steps of:
   receiving a weak global positioning system C/A code digitized data signal of a length of N ms, where N is an integer greater than 1
   generating a complex radio frequency digitized signal with a length of N ms as a local reference signal;
   first multiplying said digitized data signal from said receiving step with said digitized complex radio frequency signal;
   dividing a product from said multiplying of digitized data signal with digitized complex radio frequency signal into N equal sections of data signals;
   adding said data signals in N equal sections together from said dividing step;
   first applying a fast Fourier transform to a sum of data signals from an output of said adding step
   acquiring 1 ms of length of digitized C/A code of a preselected GPS satellite;
   second applying a fast Fourier transform to said 1 ms of digitized C/A code of a preselected GPS satellite from of said acquiring step;
   taking a complex conjugate of said fast Fourier transformation from said second applying step;
   second multiplying said complex conjugate from said taking step with said fast Fourier transformation from said first applying step; and
   taking an inverse fast Fourier transform of a product from said second multiplying steps, an index of the maximum of said inverse fast Fourier transform being an initial phase of the C/A code.

2. The simplified, weak GPS C/A code coherent acquisition method of claim 1 wherein said dividing step further includes the step of dividing an output of said first multiplying step into 10 equal sections.

3. The simplified, weak GPS C/A code coherent acquisition method of claim 2 wherein said dividing step further includes the step of dividing an output of said first multiplying step into 10 equal sections each containing 5000 data points.

4. The simplified, weak GPS C/A code coherent acquisition method of claim 1 wherein said receiving step further includes the step of receiving a weak global positioning system C/A code digitized data signal of a 10 ms length.

5. The simplified, weak GPS C/A code coherent acquisition method of claim 1 wherein said generating step further includes the step of generating a complex radio frequency digitized signal 10 ms long with a frequency of 100 Hz.

6. The simplified, weak GPS C/A code coherent acquisition method of claim 1 wherein said second applying step further comprises the step of second applying a 5,000 point fast Fourier transform 1 ms of digitized C/A code of a preselected GPS satellite from said acquiring step 3.

7. The simplified, weak GPS C/A code coherent acquisition method of claim 1 wherein said taking step further comprises the step of taking a 5,000 point inverse fast Fourier transform of a product the output of said second multiplying step.

* * * * *